Sept. 12, 1967 W. J. CLEMENT 3,341,751
ELECTRICAL COMPONENT END SEAL
Filed Feb. 8, 1965
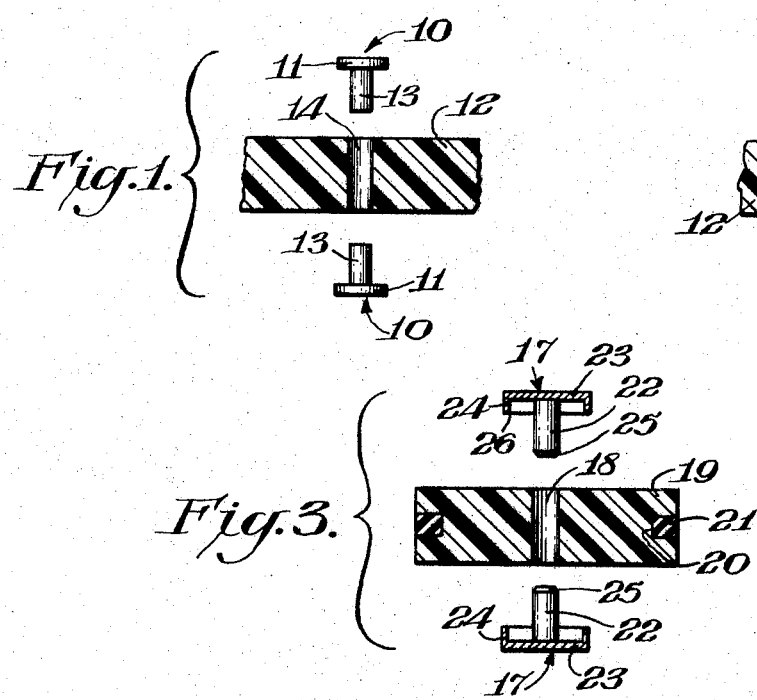
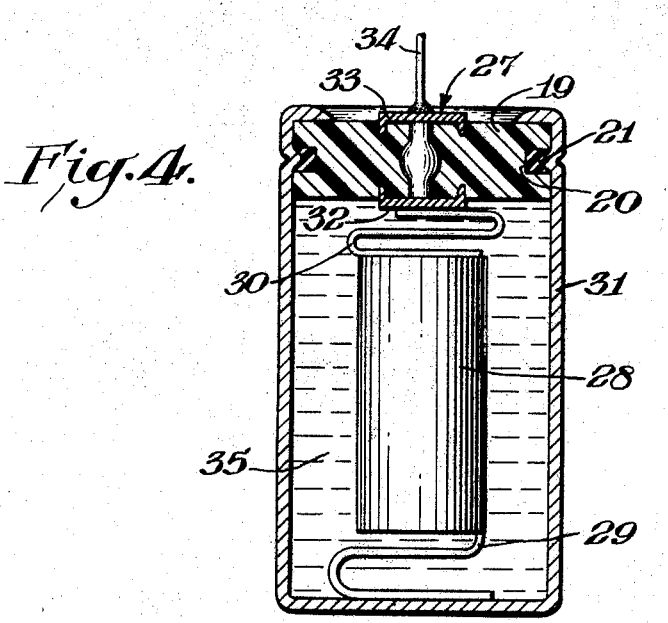
INVENTOR
Warren J. Clement
BY Connolly and Hutz
ATTORNEYS

United States Patent Office 3,341,751
Patented Sept. 12, 1967

3,341,751
ELECTRICAL COMPONENT END SEAL
Warren J. Clement, Williamstown, Mass., assignor to Sprague Electric Company, North Adams, Mass., a corporation of Massachusetts
Filed Feb. 8, 1965, Ser. No. 431,126
10 Claims. (Cl. 317—230)

ABSTRACT OF THE DISCLOSURE

The shank portions of flanged terminal members in the opposite ends of an orifice in an insulating plug are joined together to form an enlarged diameter portion within the plug so that the enlarged portion asserts substantial radial pressure on the wall of the aperture.

---

The present invention relates to a type of end seal for electrical components and more particularly to an end seal for electrolytic capacitors.

Electrical components often require the sealing of electrical devices within a container. Such containers usually comprise a tube open at one or both ends having an electrical component disposed within. Ordinarily, the open end of the container is closed by an insulator plug sealed on its extreme edges to the container and having an electrical lead passed through and sealed to the insulator. In the prior art, one difficulty has been the production of a strong seal to the center lead. Generally, the prior art seals do not produce the desired tight sealing characteristic or retain such during thermal cycling or prolonged operation at temperatures in excess of 100° C., unless an expensive glass-to-metal seal or the like is used. This invention relates to a method of providing an inexpensive seal which will withstand prolonged operation at 150° C.

A preferred embodiment of this invention is the sealing of electrolytic capacitors. Such capacitors ordinarily comprise a tubular container such as a can into which a capacitor section is placed. The container fitted with some type of end seal serves to retain the electrolyte necessary for operation of the capacitor. Such electrolyte is usually a liquid or paste and of a corrosive nature.

Prior art seals have not been successful in coping with the problem of electrolyte creepage which occurs along the boundaries of the different materials employed as the sealing means. A particular problem has been such creepage along the terminal lead which is passed through the sealing insulator. Such creepage results in a loss of electrolyte and subsequent deterioration of the electrical characteristics of the device. Creepage along the center terminal has been of special concern as regards sealing means which utilize Teflon (polytetrafluoroethylene) as the insulator. This material is desirable for sealing of electrolytic capacitors, since it has excellent electrical characteristics and, in addition, is impervious to the electrolyte. This invention, although not limited to such use, does provide a method of inexpensively sealing an electrode or terminal lead within polytetrafluoroethylene.

It is object of this invention to overcome the foregoing and related disadvantages of the prior art.

It is another object of this invention to provide a simple, inexpensive end seal for electrical components.

It is a still further object of this invention to produce an end seal suitable for enclosure of electrolytic devices.

Further objects of this invention will be apparent from the following description as well as the appended claims considered in conjunction with the accompanying drawing, wherein:

FIGURE 1 is an exploded side view in section of members which may be utilized in fabricating the subject seal.

FIGURE 2 is a side view in section of the component seal.

FIGURE 3 is an exploded side view in section of members which may be utilized in producing the preferred embodiment as shown in FIGURE 4.

FIGURE 4 is a side view in section of an electrolytic capacitor embodying the invention.

In its broadest scope, the objects set forth are achieved in accordance with this invention by the production of a seal for electrical components having a symmetrically flanged terminal extending through an orifice of an insulating plug, said flanges pressed against opposite sides of said plug, said terminal having an enlarged diameter within said orifice near the center thereof, said enlarged diameter exerting substantially radial pressure on the inner walls of said orifice.

In a more limted sense, the objects set forth are achieved in accordance with this invention by the fabrication of an end seal for electrical components which comprises an insulating plug with orifice therethrough, two identical terminal members having flanges thereon at one end thereof, said terminal members pressed into said orifice with said flanges pressed against opposite surfaces of said plug, the nonflanged ends of said terminal members joined in electrical communication within said orifice, said terminals having an enlarged diameter within said orifice in the area of said joining, said enlarged diameter exerting substantially radial pressure on the inner walls of said orifice.

In a further limited sense, the objects of this invention have been achieved through the production of an end seal for electrolytic capacitors which comprises a fluorinated ethylene plug having an orifice therethrough, two identical valve-metal terminal members having flanges thereon at the ends thereof, the non-flanged ends of said terminal members weldably joined near the center of said orifice, said flanges pressed against opposing surfaces of said plug, said terminal members having an enlarged diameter within said orifice in the area of said joining, said enlarged diameter exerting substantially radial pressure on the inner walls of said orifice.

Referring to FIGURE 1 wherein is shown an insulator 12 having an orifice 14 with flanged metal terminal members 10 positioned above opposite ends of the orifice 14. The terminal members 10 are formed with cylindrical shanks 13 having flanges 11 at one end thereof. Said shanks 13 are of such diameter as to be a close fit to said orifice 14. Within the scope of this application the term "orifice" is intended to designate the substantially cylindrical bore 14 passing completely through the insulator plug 12 and defined by the generally annular wall of the plug.

The members 10 with insulator 12, as shown in FIGURE 1, may be utilized to produce the seal shown in FIGURE 2 by, for example, abutting the nonflanged ends of terminal members 10 within the orifice 14 and butt weldably joining the same under such current and pressure as to enlarge the diameter of the shanks 13 in the area of the joint and at the same time seat the flanges 11 upon opposite surfaces of the insulator 12. The shank 13 of terminal members 10 being slightly longer than one-half the thickness of insulator 12 so as to provide sufficient material to allow enlargement of the shanks 13 while seating the flanges 11 on the insulator 12.

In FIGURE 2 is shown a sealed orifice in which a symmetrically flanged metal terminal 15 extends beyond the opposing surfaces of an insulator 12. The terminal 15 trapped within and seals the insulator 12 by means of an enlarged generally globular portion 16 of the terminal 15 and by the flanges 11.

FIGURE 3 is a view of parts utilized to produce a seal for electrolytic capacitors as shown in FIGURE 4. Referring now to FIGURE 3 wherein is shown two valve-metal terminal members 17 positioned above and below opposing ends of an orifice 18 in a cylindrical insulator plug 19. The plug 19 is shown with a circumferential groove 20 having a resilient ring 21 seated within the groove 20. Ring 21 is employed for later sealing of the outer extremity of the plug 19.

Each terminal member 17 is formed as shown with a cylindrical shank 22 having a flanged surface 23 at one end. The shank 22 is made a close fit to the orifice 18. An annulus 24 projects from the circumference of the flange 23 toward the non-flanged end 25 of the shank 22. The end 26 of the annulus 24 may be rounded or knife-edged to facilitate its biting into the plug 19 during the joining of the terminals 17 within the orifice 18. To produce the seal, the ends 25 of the terminals 17 are abutted within the orifice 18 near the center thereof. The shanks 22 of each of terminal members 17 should be of sufficient length that, with ends 25 abutted, the annulus edges 26 are slightly above opposing surfaces of the plug 19.

The terminal members 17 are then butt-welded under such current and pressure, as to join the ends 25 and enlarge the diameter of the shank 22 in the area of the weld. During this operation, the flanges 23 are pressed against, and the annuluses 24 are pressed into the plug 19. The ends 25 of the terminals 17 may be slightly concave, or the corners broken as shown, to facilitate control of the welding and enlarging.

For electrolytic capacitor use, the plug 19 may be fabricated from fluorinated ethylene such as Teflon (polytetrafluoroethylene) or the like while the terminals 17 would be formed from valve-metal such as aluminum or the like.

Referring now to FIGURE 4, a sealed electrolytic capacitor, which is a preferred embodiment of this invention, is shown. The seal, as shown, is produced from items identified in FIGURE 3. Thus, in FIGURE 4, the seal consists of a polytetrafluoroethylene plug 19 having a resilient ring 21 seated in a circumferential groove 20 in the plug 19. A terminal 27 fabricated of aluminum is sealed within the plug 19 by the means described above in the discussion of FIGURE 3.

As shown, the capacitor 28 with attached tabs 29 and 30 is inserted in a container 31. Tab 29 extends from one foil of the capacitor 28 and is welded to the container 31 while tab 30 extends from a second foil of the capacitor 28 and is welded to the internal end 32 of the terminal 27. The external end 33 of terminal 27 has an external lead 34 butt weldably attached as shown. An electrolyte 35 fills the container 31 and impregnates the capacitor 28.

The seal at the circumference of the plug is produced by circumferentially indenting the container 31 in the area adjacent the ring 21, thereby urging the inner wall of the container 31 against the ring 21. The open end of the container 31 is then rolled inwardly trapping the plug 19 in place.

The preferred form given above provides the most desirable seal in accordance with this invention, however, many different embodiments of this invention may be made without departing from the spirit and scope hereof. It is to be understood that the invention is not limited to the specific embodiments except as defined in the appended claims.

What is claimed is:

1. A process for making an end seal for electrical components comprising the steps of forming an insulating plug having an orifice therethrough, forming two symmetrically flanged terminal members having shanks of close fit to said orifice, abutting the nonflanged ends of said terminals within said orifice near the transverse center thereof with said flanges disposed above opposite sides of said plug, joining in electrical communication said members within said orifice, enlarging the diameter of said shanks within said orifice, and seating said flanges on opposite sides of said plug, said enlargement exerting substantially radial pressure on the inner walls of said orifice.

2. A process for making a seal for electrical components comprising the steps of forming an insulating plug having an orifice therethrough, forming two symmetrically flanged terminals having shanks of close fit to said orifice, said flanges having an annulus thereon on the circumference thereof, said annuluses projecting toward the nonflanged ends of said terminals, abutting said nonflanged ends within said orifice near the center thereof with said annuluses disposed slightly above opposite sides of said plug, weldably joining said terminals within said orifice, enlarging the diameter of said shanks within said orifice and seating said flanges on opposite sides of said plug with said annuluses pressed into the surfaces of said plug.

3. A process for making a seal for electrolytic capacitors comprising the steps of forming a fluorinated ethylene plug having an orifice therethrough, forming two symmetrically flanged valve-metal terminals having shanks of close fit to said orifice, each of said flanges having an annulus thereon on the circumference thereof, said annuluses projecting toward the nonflanged ends of said terminals, abutting said nonflanged ends within said orifice near the center thereof with said annuluses disposed slightly above opposite sides of said plug, weldably joining said terminals within said orifice, enlarging the diameter of said shanks within said orifice and seating said flanges on opposite sides of said plug with said annuluses pressed into the surfaces of said plug.

4. An end seal for electrical components comprising an electrical insulating plug having an orifice therethrough and an electrical conducting terminal extending through said orifice, said terminal comprising a shank within said orifice and symmetrical discs pressed against the opposite surfaces of said plug in the areas around said orifice, said shank having a globular portion of enlarged diameter in substantially radial pressure engagement with the wall defining said orifice and sealing said terminal therewith.

5. The end seal of claim 4 wherein said terminal consists of two symmetrical terminal members each comprising a disc at one end, the nondisc ends of said members being joined within said orifice near the transverse center thereof and forming said globular portion.

6. The end seal of claim 5 wherein said plug is compressible and each of said discs has an annulus projecting toward the nondisc end of said members, said annuluses being pressed into the opposite surfaces of said plug.

7. The end seal of claim 6 wherein said plug is polytetrafluoroethylene.

8. The end seal of claim 5 wherein said nondisc ends of said members are weldably joined.

9. The end seal of claim 5 wherein said members are of closed solid construction.

10. An electrolytic capacitor comprising a container having an open end, an electrolyte in said container, a capacitor immersed in said electrolyte within said container, one electrode of said capacitor in electrical communication with said container, a second electrode of said capacitor in electrical communication with an end seal closing the end of said container, said end seal comprising an electrical insulating plug having an orifice therethrough and an electrical conducting valve-metal terminal extending through said orifice, said terminal comprising a shank within said orifice and symmetrical discs pressed against the opposite surfaces of said plug in the areas around said orifice, said shank having a globular portion of enlarged diameter in substantially radial pressure engagement with the wall defining said orifice and sealing said terminal therewith.

References Cited

UNITED STATES PATENTS

| 2,202,166 | 5/1940 | Peck. |
| 2,485,629 | 10/1949 | Mosthaf. |
| 3,114,085 | 12/1963 | Ruscetta et al. |
| 3,131,137 | 4/1964 | Clement. |
| 3,174,085 | 3/1965 | Schroeder et al. |

JAMES D. KALLAM, *Primary Examiner.*